(12) United States Patent
Oh et al.

(10) Patent No.: US 8,009,859 B2
(45) Date of Patent: Aug. 30, 2011

(54) METHOD AND SYSTEMS FOR SELECTING TEST STIMULI FOR USE IN EVALUATING PERFORMANCE OF VIDEO WATERMARKING METHODS

(75) Inventors: Weon Geun Oh, Daejeon (KR); Ik Hwan Cho, Incheon (KR); Dong Seok Jeong, Incheon (KR); Hae Gwang Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1055 days.

(21) Appl. No.: 11/577,030

(22) PCT Filed: Oct. 18, 2005

(86) PCT No.: PCT/KR2005/003468
§ 371 (c)(1),
(2), (4) Date: Apr. 11, 2007

(87) PCT Pub. No.: WO2006/065023
PCT Pub. Date: Jun. 22, 2006

(65) Prior Publication Data
US 2008/0085054 A1 Apr. 10, 2008

(30) Foreign Application Priority Data
Dec. 13, 2004 (KR) .................. 10-2004-0105087

(51) Int. Cl.
*G06K 9/00* (2006.01)
(52) U.S. Cl. ........................ 382/100; 382/224
(58) Field of Classification Search ............... 382/100, 382/224
See application file for complete search history.

(56) References Cited

U.S. PATENT DOCUMENTS
6,222,932 B1 * 4/2001 Rao et al. .................. 382/100
(Continued)

FOREIGN PATENT DOCUMENTS
JP 2002-231017 A 8/2001
(Continued)

OTHER PUBLICATIONS
Bhanu, "Evaluation of automatic target recognition algorithms", 1983, Architectures and Algorithms for Digital Image Processing, SPIE Proceedings vol. 435, 18-27.*
(Continued)

*Primary Examiner* — Bhavesh Mehta
*Assistant Examiner* — Katrina Fujita
(74) *Attorney, Agent, or Firm* — Ladas & Parry LLP (57) ABSTRACT

Provided is a method of selecting test stimuli for use in evaluating performance of a video watermarking algorithm, including the steps of: calculating an image complexity rate (ICR) for each of a plurality of test stimulus candidates and classifying them into L (where L is an integer more than or equal to 2) levels based on the calculated ICR values; calculating an energy distribution rate (EDR) for each of the plurality of test stimulus candidates, and classifying them into M (where M is an integer more than or equal to 2) levels based on the calculated EDR values; calculating a motion rate (MR) for each of the plurality of test stimulus candidates and classifying them into N (where N is an integer more than or equal to 2) levels of the calculated MR values; and selecting at least one test stimulus from each of the L levels, M levels, the N levels of the test stimuli, respectively.

10 Claims, 6 Drawing Sheets

U.S. PATENT DOCUMENTS

| | | | |
|---|---|---|---|
| 6,546,114 B1 | 4/2003 | Venkatesan et al. | |
| 7,339,617 B1 * | 3/2008 | Kondo et al. | 348/222.1 |
| 7,508,944 B1 * | 3/2009 | Brunk | 380/252 |
| 7,515,731 B2 * | 4/2009 | Koto et al. | 382/100 |
| 2002/0051560 A1 | 5/2002 | Donescu et al. | |
| 2004/0001607 A1 | 1/2004 | Hwang et al. | |
| 2004/0071312 A1 | 4/2004 | Ogawa et al. | |
| 2005/0069168 A1 | 3/2005 | Zarrabizadeh | |
| 2005/0265452 A1 * | 12/2005 | Miao et al. | 375/240.16 |

FOREIGN PATENT DOCUMENTS

| | | |
|---|---|---|
| JP | 2004-348293 A | 12/2004 |
| KR | 1999-0076464 A | 10/1999 |

OTHER PUBLICATIONS

Cho, I.H., et al., "Guideline for the Selection of Standardized Test Stimuli in the Evaluation of Video Watermarking." Oct. 2004. *International Organisation for Standardisation (ISO/IECJTC1/SC29/WG11), MPEG21/M11201.*

* cited by examiner

METHOD AND SYSTEMS FOR SELECTING TEST STIMULI FOR USE IN EVALUATING PERFORMANCE OF VIDEO WATERMARKING METHODS

BACKGROUND ART

1. Field of the Invention

The present invention relates to a performance evaluation mechanism of a video watermarking algorithm, and more specifically, to a method and system for selecting test stimuli to insure a reliable evaluation result in evaluating performance of a video watermarking method.

2. Description of Related Art

Robustness is one of the important factors to consider in the evaluation of a video watermarking method. The robustness refers to a performance capable of detecting the existence of a watermark embedded in images even when distortion attacks are intentionally or unintentionally applied. In general, in order to evaluate the robustness of a video watermark algorithm, a specific watermark is embedded in a test stimuli, i.e., video data, with the associated watermarking algorithm, and then, various attack functions are applied to the stimuli in which the watermark has been embedded, in order to produce intentional distortion. Finally, by measuring the similarity between the detected watermark and the original watermark, the robustness of the watermark algorithm can be evaluated.

These kinds of robustness evaluation methods have been proposed in many scientific papers and utilized in real applications. However, although a lot of attack functions have been proposed and categorized, there has been no report or publication on the selection of the test stimuli in the evaluation process.

To insure reliable evaluation results for the robustness of each video watermarking method (or algorithm), it should be guaranteed that the evaluation process gives the same or very similar results for each test stimulus. However, it is impossible to achieve without establishing some criteria for the selection of the test stimuli. Therefore, in order to reliably evaluate the robustness of the video-watermarking algorithm, it is necessary to establish a standardized guideline for the selection of video stimuli.

SUMMARY OF THE INVENTION

The present invention is directed to providing certain criteria for the selection of test stimuli used in performance evaluation of a video watermarking algorithm.

The present invention is also directed to insuring the reliability of performance evaluation of a video watermarking algorithm by providing selection criteria based on a spatial domain, a frequency domain, and a motion domain of test stimuli, in the selection of test stimuli used in evaluating performance of the video-watermarking algorithm.

One aspect of the present invention is to provide a method of selecting test stimuli for use in evaluating performance of a watermarking algorithm. The method includes the steps of: calculating an image complexity rate (ICR) for each of a plurality of test stimulus candidates; classifying said plurality of test stimulus candidates into L (where L is an integer more than or equal to 2) levels of the test stimuli, based on the calculated ICR values; and selecting at least one test stimulus from each of the L levels of the test stimuli.

Another aspect of the present invention is to provide a method of selecting test stimuli for use in evaluating performance of a watermarking algorithm, the method includes the steps of: calculating an energy distribution rate (EDR) for each of a plurality of test stimulus candidates; classifying said plurality of test stimulus candidates into M (where M is an integer more than or equal to 2) levels of the test stimuli, based on the calculated EDR values; and selecting at least one test stimulus from each of the M levels of the test stimuli.

Still another aspect of the present invention is to provide a method of selecting test stimuli for use in evaluating performance of a watermarking algorithm, the method includes the steps of: calculating a motion rate (MR) for each of a plurality of test stimulus candidates; classifying the plurality of test stimulus candidates into N (where N is an integer more than or equal to 2) levels of the test stimuli, based on the calculated MR values; and selecting at least one test stimulus from each of the N levels of the test stimuli.

Yet another aspect of the present invention is to provide a method of selecting test stimuli for use in evaluating performance of a video watermarking algorithm, the method includes the steps of: calculating an image complexity rate (ICR) for each of a plurality of test stimulus candidates and classifying them into L (where L is an integer more than or equal to 2) levels based on the calculated ICR values; calculating an energy distribution rate (EDR) for each of the plurality of test stimulus candidates, and classifying them into M (where M is an integer more than or equal to 2) levels based on the calculated EDR values; calculating a motion rate (MR) for each of the plurality of test stimulus candidates and classifying them into N (where N is an integer more than or equal to 2) levels of the calculated MR values; and selecting at least one test stimulus from each of the L levels, each of the M levels, each of the N levels of the test stimuli, respectively.

Yet another aspect of the present invention is to provide a system for selecting test stimuli for use in evaluating performance of a video-watermarking algorithm. The system includes: first classification means for calculating an image complexity rate (ICR) for each of a plurality of test stimulus candidates and classifying them into L (where L is an integer more than or equal to 2) levels based on the calculated ICR values; second classification means for calculating an energy distribution rate (EDR) for each of the plurality of test stimulus candidates, and classifying them into M (where M is an integer more than or equal to 2) levels based on the calculated EDR values; third classification means for calculating a motion rate (MR) for each of the plurality of test stimulus candidates and classifying them into N (where N is an integer more than or equal to 2) levels based on the calculated MR values; and selection means for selecting at least one test stimulus from each of the L levels, each of the M levels, each of the N levels of the test stimuli, respectively.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

First, we assume that the performance evaluation system of the present invention is unaware of a video-watermarking algorithm. Accordingly, test stimuli can be selected independent of the watermarking algorithm to be evaluated. For the performance evaluation of the watermarking algorithm, the present invention proposes a guideline for the selection of the test stimuli rather than a fixed database of the test stimuli.

To insure reliable results of the watermarking algorithm evaluation, evaluation should be performed using a number of test stimuli having a wide range of features, which is impractical. It is difficult not only to produce a number of test stimuli having a wide range of features, but also to establish a definite guideline for each of the characteristics of these test stimuli.

Therefore, in order to establish a guideline for the selection of test stimuli, the present invention classifies the test stimuli into some different levels according to three criteria, i.e., an image complexity rate (ICR), an energy distribution rate (EDR), and a motion rate (MR).

Figure 1:
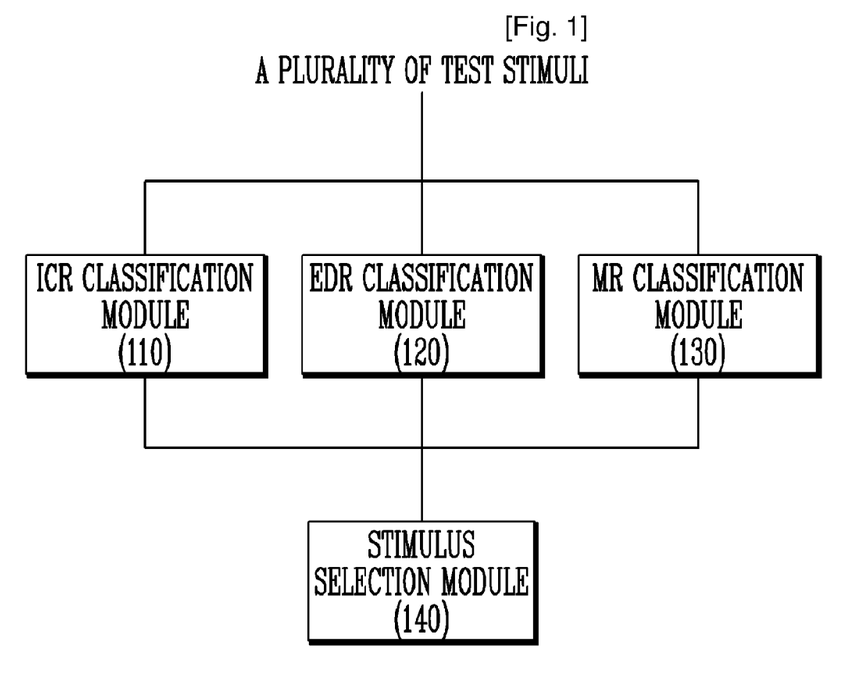
FIG. 1 is a schematic block diagram of a test stimulus selection system for evaluating performance of a video watermarking algorithm according to an embodiment of the present invention.

FIG. 1 is a schematic block diagram of a test stimulus selection system for evaluating performance of a video watermarking algorithm according to an embodiment of the present invention. Blocks 110, 120 and 130 indicate independent modules, respectively, and those skilled in the art will readily appreciate that some of these blocks can be omitted in other embodiments.

As shown in FIG. 1, an ICR classification module 110 calculates an image complexity rate (ICR) for each of a number of test stimuli candidates, and classifies them into L (L>1) predefined levels according to the calculated ICRs.

An EDR classification module 120 calculates an energy distribution rate (EDR) for each of a number of test stimuli candidates, and then classifies them into M (M>1) predefined levels according to the calculated EDRs. An MR classification 130 calculates a motion rate (MR) for each of a number of test stimuli candidates, and classifies them into N (N>1) predefined levels according to the calculated MRs.

A test stimuli selection module 140 selects a final group of the test stimuli among a number of the candidates. It determines a final group of the test stimuli so that each stimulus is selected from a different level of the stimuli classified by the ICR classification module 110, the EDR classification module 120 and the MR classification module 130, respectively.

The following Table 1 indicates a relation between video watermarking evaluation domains and their criteria in the evaluation of the video-watermarking algorithm according to the present invention.

TABLE 1

| Domain | Criteria |
| --- | --- |
| Spatial domain | Image Complexity Rate (ICR) |
| Frequency domain | Energy Distribution Rate (EDR) |
| Motion domain | Motion Rate (MR) |

Test video stimuli have various features that need to be considered in the evaluation process. Some features are related to a specific watermarking algorithm, while other features are rather general in nature. In general, the features of a video sequence can be classified into the spatial and frequency domains, in a similar manner to a still image. In addition, however, a video sequence also has a motion domain, which is a key element distinguishing it from the still image. These three domain elements are the most general domains to be considered in establishing criteria for the selection of the test stimuli. Therefore, as described in Table 1, the present invention proposes three criteria for the classification of the stimuli from each of the spatial, frequency and motion domains.

Image Complexity Rate (ICR)

First, in order to consider the spatial domain features of the video, an ICR is used as a selection criterion. A video is essentially a sequential set of still images, and each frame in the video (as in the case of a still image) consists of homogenous regions and edges. Therefore, the robustness of the watermarking process may differ depending on the number of edges and their amplitude. To quantify the number and amplitude of the edges, the concept of ICR is used. In general, the complexity of an image is considered to increase as the number of edges increases. However, it is not sufficient to define the complexity of an image based solely on such a simple concept as the number of edges. Edges can be treated as an intensity differences among pixels. Therefore, it may be desirable that the image complexity rate (ICR) be treated through an intensity level-dependent method rather than an edge-dependent one. The standard deviation of the overall image and entropy of the histogram are two of the simplest measures of contrast. However, it is too simple to measure the uniformity of the overall frame image. Therefore, the present invention uses the following function, which was proposed by Bhanu as an image complexity measure.

$$U = -\frac{1}{w \times h}\sum_{x=1}^{w}\sum_{y=1}^{h}[f(x, y) - \bar{f}(x, y)]^2 \qquad \text{[Equation 1]}$$

where f(x, y) is the intensity-level at pixel (x, y)

and $\bar{f}$(x, y) is the average gray-level in a 3×3 window centered at (x, y)

and w and h are the width and height of the image.

The image complexity rate function defined in Eq. 1 is a global average of a local intensity level gradient and therefore can measure both the uniformity and contrast of an image. In another embodiment, to emphasize the edges, Eq. 1 can be modified to counter the number of local gradient whose value is greater than a predefined threshold value. However, the resulting complexity values are still very similar to each other.

Figure 2:
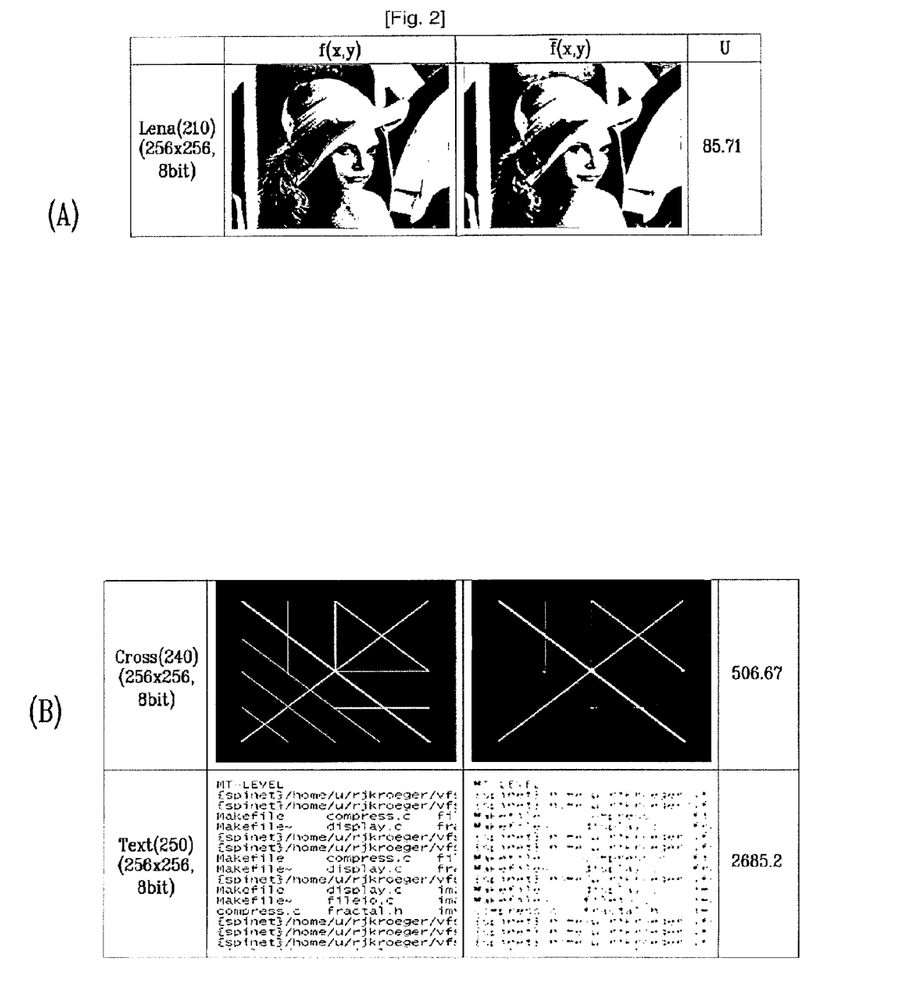
FIG. 2 is a diagram showing 5 sample images used to calculate an image complexity rate and respective complexity rate measures according to the present invention.

FIG. 2 is a diagram showing 5 sample images used to calculate an image complexity rate and respective complexity rate measures according to the present invention. From FIG. 2, it can be seen that the image complexity rate measure does not always depend solely on the number of edges. For example, in the Cross image 240 and the Text image 250, the measure value sometimes depends on the number of edges, but in the Lena image 210, it does not. Instead, it can be appreciated that the contrast of the edge may affect the overall measure value.

According to an embodiment, the video stimuli can be classified into 4 levels as shown in Table 2 according to the image complexity rate described above. In an embodiment of the watermarking algorithm evaluation process according to the present invention, the ICR of each stimulus is calculated, and more than 4 stimuli included in each level should be selected as the final test stimuli. While the number of the levels of the image complexity rate is determined to be 4 in the present invention, the present invention is not limited thereto, but it will be appreciated that the test stimuli can be classified into more or less levels of the image complexity rate, if required.

TABLE 2

| Level | Range |
| --- | --- |
| ICR 1 | 0~100 |
| ICR 2 | 100~300 |
| ICR 3 | 300~600 |
| ICR 4 | 600~ |

Energy Distribution Rate (EDR)

Many watermarking algorithms have used a frequency domain as an embedding domain of the information used to improve robustness. In general, those watermarking algorithms using the frequency domain are known to be more robust than those using the spatial domain, even if they have several disadvantages in certain areas. The main point to consider when using the frequency domain in a watermarking algorithm is to modify the data of a specific frequency band to embed the information. In general, the data of the mid-frequency range are widely used, because the modification of low-frequency information induces a large distortion of the source image, while the modification of the high-frequency range does not guarantee the robustness.

According to an embodiment of the present invention, the EDR is used to classify the stimuli according to the frequency domain. The EDR is a reflection of how the energy of a video sequence is distributed within a specific frequency band. The EDR can be implemented using various methods. In an embodiment of the present invention, the EDR is implemented using a reordering method of DCT-AC coefficients. In order to obtain frequency information, many transforms, such as the Fourier transform, DCT transform and Wavelet transform can be used. In a preferred embodiment, the DCT transform, which is the most generally employed in the video compression, is used herein. In reality, both JPEG and MPEG are based on the DCT transform.

Figure 3:
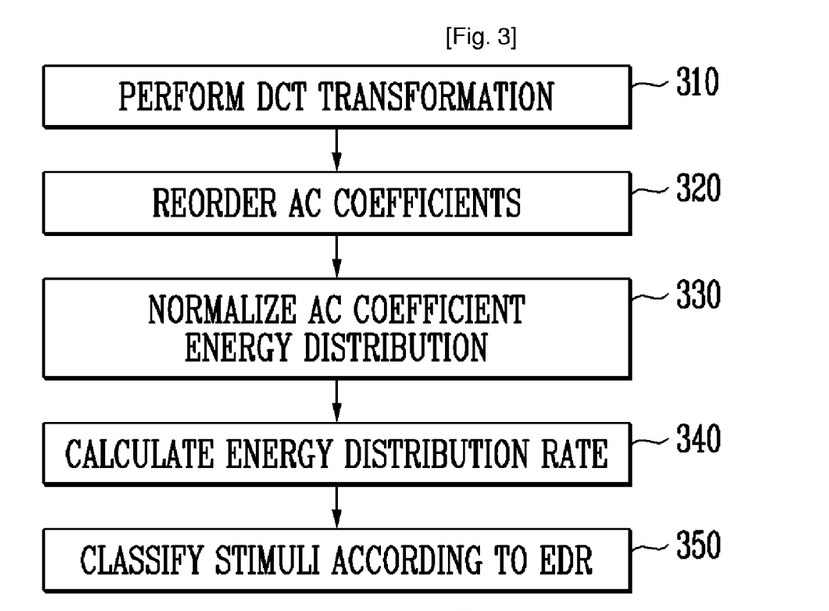
FIG. 3 is a flowchart schematically showing a process of calculating an EDR according to an embodiment of the present invention.

FIG. 3 is a flowchart schematically showing a process of calculating an EDR according to an embodiment of the present invention. First, in step 310, the whole DCT transform is applied to the image (or each frame) to generate the DCT coefficient. Then, the 2D spatial image is converted to the 2D frequency image, which consists of frequency coefficients of equal dimension. In step 320, all of the AC coefficients, except for the DC coefficient, are reordered using a zigzag scan method. The zigzag scan method is typically used in JPEG and MPEG compression.

Figure 4:
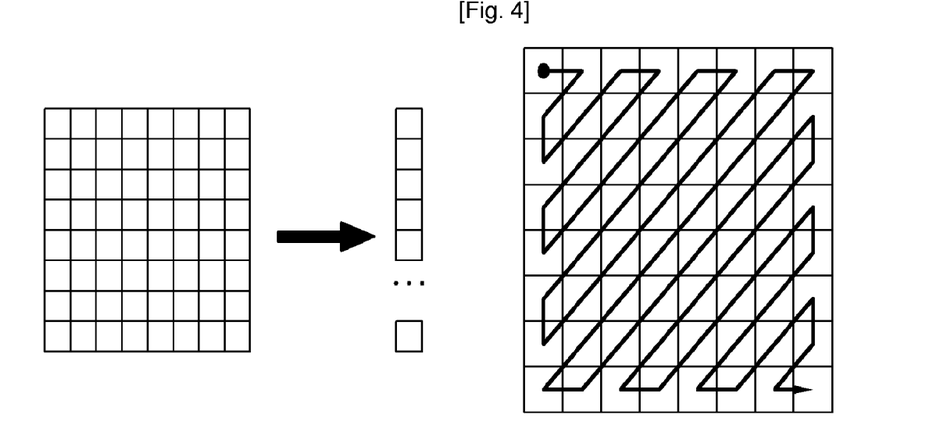
FIG. 4 is a diagram illustrating a concept of a zigzag scan method used for reordering 2D frequency images into 1D images.

FIG. 4 illustrates a concept of the zigzag scan method. Once the DCT transform has been applied, the energy is generally concentrated in the top left position, which corresponds to the low-frequency range, whereas the right-bottom corresponds to the high-frequency range. Therefore, the 2D energy distribution is converted to the 1D distribution by using the zigzag scan method, which is a simple method and the one that is the most general.

Figure 5:
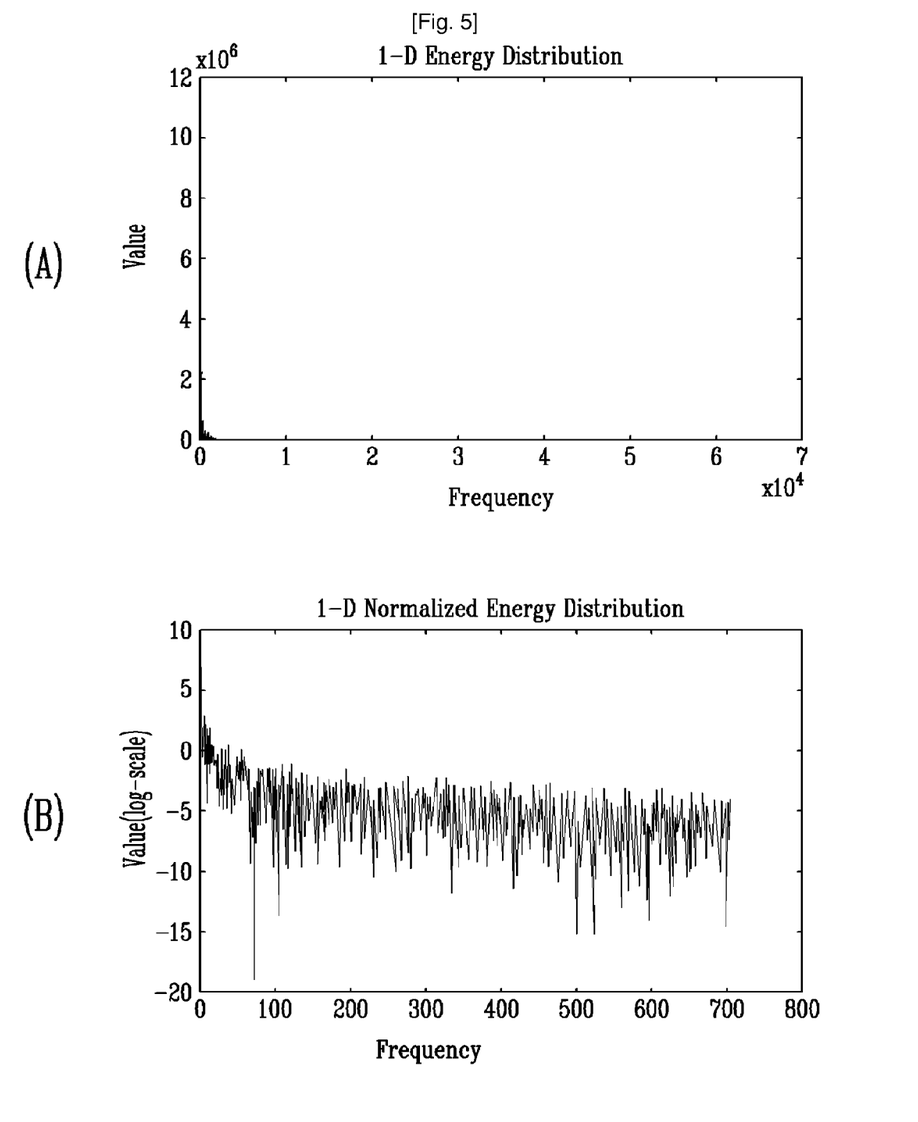
FIGS. 5A and 5B show plots of the 1D energy distribution and the normalized energy distribution for a Lena image of FIG. 2, respectively.
Figure 6:
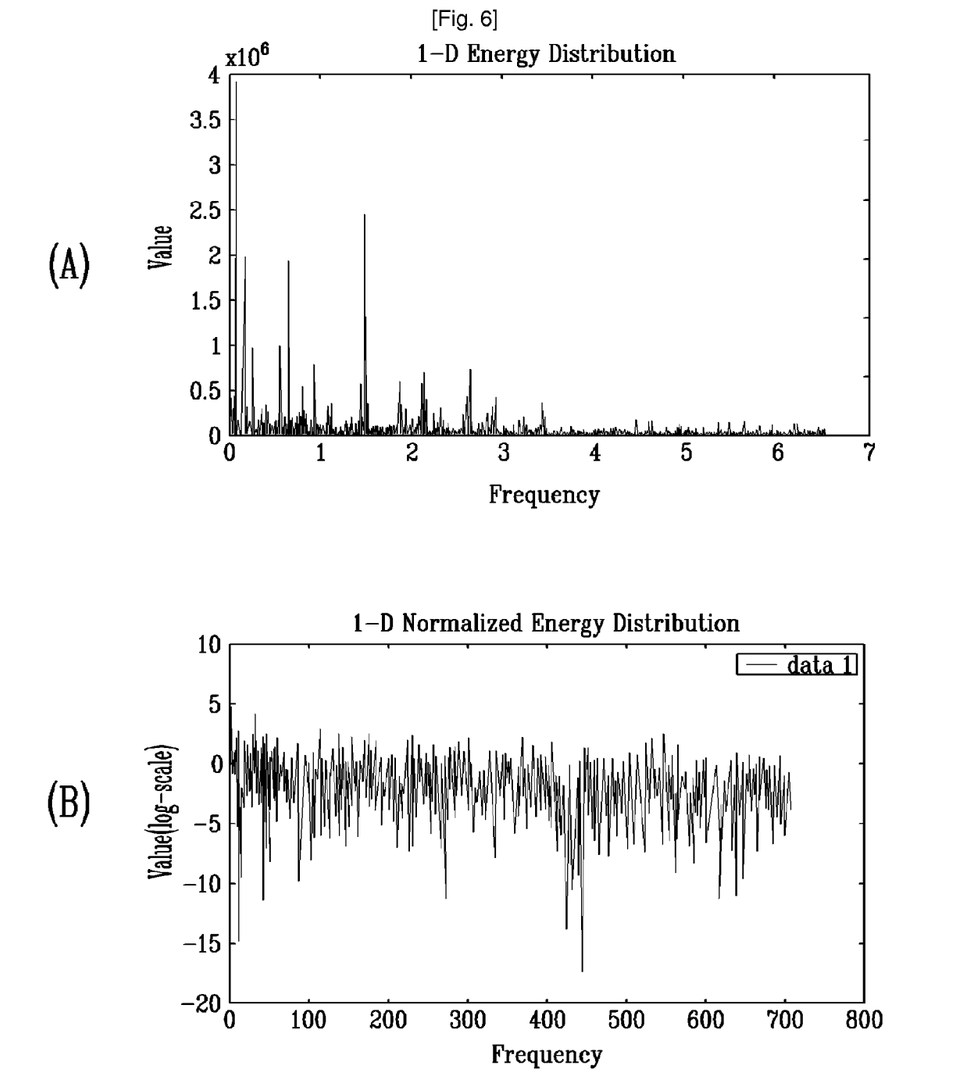
FIGS. 6A and 6B show plots of the 1D energy distribution and the normalized energy distribution for a Text image, respectively.

Referring again to FIG. 3, in step 330, the energy of the AC coefficients is calculated from the reordered 1D data in step 320 using the following Equation 2, and then the 1D energy distribution is normalized for length and amplitude.

$$E(s) = T(s)^2, s \in [0, N]$$ [Equation 2]

where s is the position in the 1-D distribution, N is the number of AC coefficients, and T is the reordered AC coefficients and E is the energy distribution. FIGS. 5A and 5B show plots of the 1D energy distribution and the normalized energy distribution for a Lena image 210 of FIG. 2, respectively; and FIGS. 6A and 6B show plots of the 1D energy distribution and the normalized energy distribution for a Text image 250, respectively.

Next, in FIG. 340, the energy distribution rate (EDR) is calculated using a normalization value calculated in the above step 330. Because the whole DCT transform is applied, it is difficult to identify the rate of the energy concentration on full bandwidth. In the case of a 256×256 grayscale image, recognizing the difference between two EDRs is not easy, even if two different images are used. Because the image information is mostly concentrated in the low-frequency range, the amount of information stored in the right-bottom AC coefficients is very small relative to that stored in the low-frequency range. In general, performing a block-by-block transform solves this problem more or less. In some blocks, approximating the energy distribution is more convenient, because the number of coefficients is limited. However, in the present invention, the whole DCT transform is used, so that a priority is given to the global distribution rather than the local distribution. Therefore, in the classification of the stimuli, some parts of the energy distribution will be used except for some partial high-frequency information (e.g., more than 70%).

The EDR according to an embodiment of the present invention is calculated using the following Equation 3. Preferably, in the following Equation 3, the log scale is used to perceive a change in the distribution in the high frequency range, considering that the energy in the high frequency range has a relatively small value. The EDR has a small value for a low-frequency concentrated image, and a large value for a high-frequency concentrated image.

$$EDR = \frac{1}{N_{limit}} \sum_{i=1}^{N_{limit}} \cdot \frac{i}{N} \cdot \log(E(i))$$ [Equation 3]

where $N_{limit}$ is the number of AC coefficients except 30% of high frequency.

In step 350, the test stimuli are classified using the EDR calculated in step 340. According to an embodiment of the present invention, the EDR is classified into 3 levels. In the evaluation process of the test stimuli, the EDR of the stimuli is calculated, and more than 3 of the stimuli included in each level should be selected as the final test stimuli. While the number of the EDR levels is 3 in the above embodiment, the present invention is not limited thereto, but it will be appreciated that the test stimuli can be classified into more or less EDR levels, if required.

Motion Rate (MR)

Motion is the most specific feature to video, in that it has temporal information. Video compression algorithms such as MPEG4 and H.264/AVC estimate and compensate for motion in the images between successive frames. Therefore, in the evaluation of video watermarking algorithms, motion has to be considered in selecting the test stimuli. Although not many algorithms using motion information have been proposed yet, it is expected that motion will be utilized in many algorithms in the future. Because motion may be used directly for embedding information, the present invention defines the MR as a criterion for the classification of the stimuli, considering the motion information. The following Equation 4 represents the MR for a video stimulus.

$$M = \frac{1}{NF} \sum_{i=1}^{NF} \sum_{j=0}^{TMV_i} |v_{i,j}|$$ [Equation 4]

where NF is the number of frames of stimulus and $TMV_i$ is the number of motion vectors in the ith frame and $v_{i,j}$ is the jth motion vector in the ith frame. The MR calculated in the Equation 4 is the average amount of motion resulting from all of the motion vectors, where the motion vectors are calculated block-by-block. According to an embodiment, a block size for the motion vector is fixed to 8×8, which is the most general case. The more motion the video sequence contains, the higher the MR value.

Figure 7:
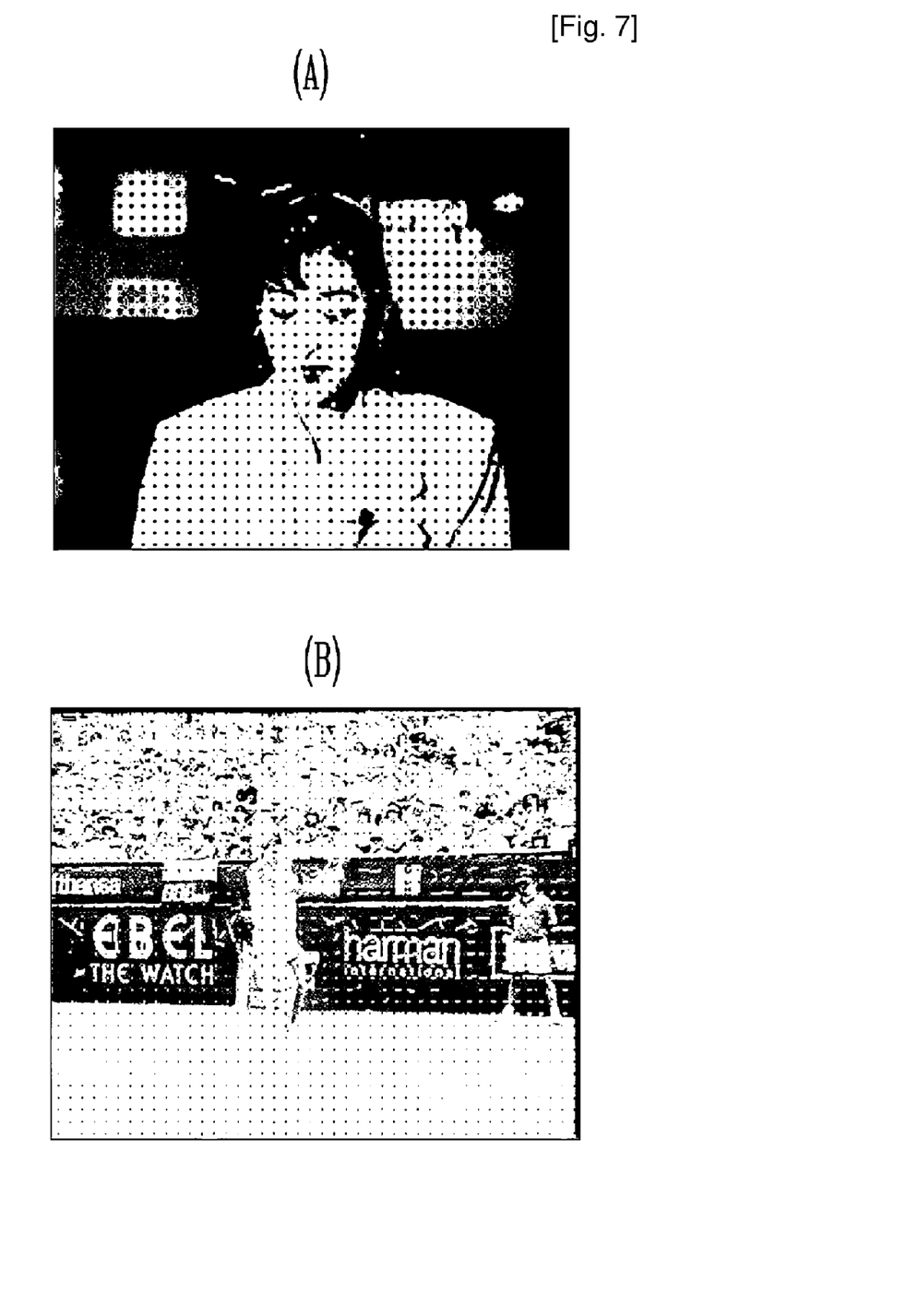
FIGS. 7A and 7B show the motion vectors of two video stimuli, respectively.

FIGS. 7A and 7B show the motion vectors of two video stimuli, respectively, in which white lines indicate the motion vectors and block dots indicate the center of the motion block. As illustrated herein, the image of Akiyo shown in FIG. 7A has few motion vectors, whereas that of Stefan shown in FIG. 7B has a large number of motion vectors.

As in the case of the ICR and EDR, the video stimuli can be divided into 3 levels according to the MR value. In the evaluation process of the video compression algorithm, the MR of each test stimuli is calculated and more than 3 of the stimuli included in each of the 3 predefined levels should be selected as the final test stimuli. While the number of the levels is determined to be 3 in the present invention, the present invention is not limited thereto, but it will be appreciated that the test stimuli can be classified into more or less levels, if required.

For performance evaluation of a video-watermarking algorithm, a plurality of test stimuli are selected based on a stimulus selection method according to the present invention, to thus ensure reliability of the evaluation results.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

The invention claimed is:

1. A method of selecting test stimuli for use in evaluating performance of a watermarking algorithm, the method comprising the steps of:

calculating an image complexity rate (ICR) for each of a plurality of test stimulus candidates;

classifying said plurality of test stimulus candidates into a plurality of L levels of the test stimuli, based on the calculated ICR values, where L is an integer greater than 2, and wherein each of the plurality of L levels has a predetermined ICR range, and wherein the ICR is calculated using the following Equation:

$$U = -1 * \frac{1}{w \times h} \sum_{x=1}^{w} \sum_{y=1}^{h} [f(x, y) - \overline{f}(x, y)]^2$$

where f(x, y) is the intensity-level at pixel (x, y) and $\overline{f}(x,y)$ is the average gray-level in a 3×3 window centered at (x, y) and w and h are the width and height of the image; and selecting at least one test stimulus from each of the L levels of the test stimuli.

2. The method according to claim 1, wherein the L value is 4, and a range of the ICR for a level 1 is more than or equal to 0 to less than 100, a range of the ICR for a level 2 is more than or equal to 100 to less than 300, a range of the ICR for a level 3 is more than or equal to 300 to less than 600, and a range of the ICR for a level 4 is more than or equal to 600.

3. A method of selecting test stimuli for use in evaluating performance of a watermarking algorithm, the method comprising the steps of:

calculating an energy distribution rate (EDR) for each of a plurality of test stimulus candidates;

classifying the plurality of test stimulus candidates into M levels of the test stimuli, based on the calculated EDR values, where M is an integer greater than or equal to 2; and selecting at least one test stimulus from each of the M levels of the test stimuli, wherein said step of calculating the energy distribution rate (EDR) for each of the plurality of test stimulus candidates includes the steps of:

applying DCT transformation to each 2D image(s) of each of the test stimulus candidates;

reordering AC coefficients of the DCT transformed image(s) to generate 1D image data;

calculating and normalizing energy distribution (E) of the AC coefficients from the generated 1D image data using the following Equation:

$E(s)=T(s)^2, s \in [0,N]$ where s is the position in the 1-D distribution, N is the number of AC coefficients, and T is the reordered AC coefficients and E is the energy distribution; and calculating the EDR based on the normalized energy distribution (E) using the following Equation:

$$EDR = \frac{1}{N_{limit}} \sum_{i=1}^{N_{limit}} \cdot \frac{i}{N} \cdot \log(E(i))$$

where $N_{limit}$ is the number of AC coefficients except 30% of high frequency.

4. The method according to claim 3, wherein the M value is 3.

5. A method of selecting test stimuli for use in evaluating performance of a video watermarking algorithm, the method comprising:

calculating a motion rate (MR) for each of a plurality of test stimulus candidates;

classifying the plurality of test stimulus candidates into N levels of the test stimuli, based on the calculated MR values, where N is an integer greater than or equal to 2; and selecting at least one test stimulus from each of the N levels of the test stimuli, wherein the MR is calculated using the following Equation:

$$M = \frac{1}{NF}\sum_{i=1}^{NF}\sum_{j=0}^{TMV_i} |v_{i,j}|$$

where NF is the number of frames of stimulus and $TMV_i$ is the number of motion vectors in the ith frame and $v_{i,j}$ is the jth motion vector in the ith frame.

6. The method according to claim 5, wherein the N value is 3.

7. A method of selecting test stimuli for use in evaluating performance of a watermarking algorithm, the method comprising the steps of:

calculating an image complexity rate (ICR) for each of a plurality of test stimulus candidates and classifying them into a plurality of L levels based on the calculated ICR values, where L in an integer greater than 2 and wherein each of the plurality of L levels has a predetermined ICR range, wherein each of the plurality of L levels has a predetermined ICR range, and wherein the ICR is calculated using the following Equation:

$$U = -1 * \frac{1}{w \times h}\sum_{x=1}^{w}\sum_{y=1}^{h}[f(x,y) - \bar{f}(x,y)]^2$$

where f(x,y) is the intensity-level at pixel (x, y) and $\bar{f}$(x,y) is the average gray-level in a 3×3 window centered at (x, y) and w and h are the width and height of the image; and selecting at least one test stimulus from each of the L levels of the test stimuli;

calculating an energy distribution rate (EDR) for each of the plurality of test stimulus candidates, and classifying them into M (where M is an integer more than or equal to 2) levels based on the calculated EDR values;

calculating a motion rate (MR) for each of the plurality of test stimulus candidates and classifying them into N (where N is an integer more than or equal to 2) levels of the calculated MR values; and selecting at least one test stimulus from each of the L levels, each of the M levels, each of the N levels of the test stimuli, respectively.

8. A system for selecting test stimuli for use in evaluating performance of a video watermarking algorithm, the system comprising:

first classification unit for calculating an image complexity rate (ICR) for each of a plurality of test stimulus candidates and classifying them into a plurality of L levels based on the calculated ICR values, wherein L is an integer greater than 2, and wherein each of the plurality of L levels has a predetermined ICR range, and wherein the ICR is calculated using the following Equation:

$$U = -1 * \frac{1}{w \times h}\sum_{x=1}^{w}\sum_{y=1}^{h}[f(x,y) - \bar{f}(x,y)]^2$$

where f(x, y) is the intensity-level at pixel (x, y) and $\bar{f}$(x, y) is the average gray-level in a 3×3 window centered at (x, y) and w and h are the width and height of the image;

second classification unit for calculating an energy distribution rate (EDR) for each of the plurality of test stimulus candidates, and classifying them into M levels based on the calculated EDR values, where M is an integer greater than or equal to 2;

third classification unit for calculating a motion rate (MR) for each of the plurality of test stimulus candidates and classifying them into N levels based on the calculated MR values, where N is an integer greater than or equal to 2; and selection unit for selecting at least one test stimulus from each of the L levels, each of the M levels, each of the N levels of the test stimuli, respectively.

9. The system according to claim 8, wherein said second classification unit includes:

applying DCT transformation to each 2D image(s) of each of the test stimulus candidates;

reordering AC coefficients of the DCT transformed image(s) to generate 1D image data;

calculating and normalizing energy distribution (E) of the AC coefficients from the generated ID image data using the following Equation:

$E(s) = T(s)^2, s \in [0,N]$ where s is the position in the 1-D distribution, N is the number of AC coefficients, and T is the reordered AC coefficients and E is the energy distribution; and calculating the EDR based on the normalized energy distribution (E) using the following Equation:

$$EDR = \frac{1}{N_{limit}}\sum_{i=1}^{N_{limit}} \cdot \frac{i}{N} \cdot \log(E(i))$$

where $N_{limit}$ is the number of AC coefficients except 30% of high frequency.

10. The system according to claim 8, wherein said third classification unit calculates the MR value using the following Equation:

$$M = \frac{1}{NF}\sum_{i=1}^{NF}\sum_{j=0}^{TMV_i} |v_{i,j}|$$

where NF is the number of frames of stimulus and $TMV_i$ is the number of motion vectors in the ith frame and $v_{i,j}$ is the jth motion vector in the ith frame.

* * * * *